(12) United States Patent
Ferber et al.

(10) Patent No.: US 12,149,115 B2
(45) Date of Patent: Nov. 19, 2024

(54) POWER BANK AND PACKAGING SYSTEM FOR A POWER BANK

(71) Applicant: RFA Brands, LLC, Birmingham, MI (US)

(72) Inventors: Roman Ferber, Birmingham, MI (US); Jorge Carrillo, Rochester Hills, MI (US)

(73) Assignee: RFA Brands, LLC, Birmingham, MI (US)

( * ) Notice: Subject to any disclaimer, the term of this patent is extended or adjusted under 35 U.S.C. 154(b) by 150 days.

(21) Appl. No.: 17/881,040

(22) Filed: Aug. 4, 2022

(65) Prior Publication Data

US 2022/0376543 A1  Nov. 24, 2022

Related U.S. Application Data

(60) Division of application No. 17/395,140, filed on Aug. 5, 2021, which is a continuation-in-part of application No. 17/209,378, filed on Mar. 23, 2021, now abandoned.

(51) Int. Cl.
| | |
|---|---|
| *H02J 7/02* | (2016.01) |
| *H02J 7/00* | (2006.01) |
| *H02J 7/34* | (2006.01) |
| *H02J 50/00* | (2016.01) |
| *H02J 50/10* | (2016.01) |

(52) U.S. Cl.
CPC .............. *H02J 7/02* (2013.01); *H02J 7/0042* (2013.01); *H02J 7/342* (2020.01); *H02J 50/005* (2020.01); *H02J 50/10* (2016.02)

(58) Field of Classification Search
CPC .. H02J 7/02; H02J 7/0042; H02J 7/342; H02J 50/005; H02J 50/10
USPC .................................................. 320/107, 108
See application file for complete search history.

(56) References Cited

U.S. PATENT DOCUMENTS

| | | |
|---|---|---|
| 7,952,322 B2 | 5/2011 | Partovi et al. |
| 8,092,251 B2 | 1/2012 | Rosenblatt |
| 9,313,610 B2 | 4/2016 | Ojala |

(Continued)

OTHER PUBLICATIONS

"MyCharge Portable Charger". Found on line Oct. 16, 2023 at amazon.com. Reference dated Jul. 27, 2021. Retrieved from https://www.amazon.com/myCharge-Superhero-Compatible-Magnetic-Wireless/dp/B09 B96CC2T /?th= 1 (Year: 2021).

(Continued)

*Primary Examiner* — Richard V Muralidar
(74) *Attorney, Agent, or Firm* — Brooks Kushman P.C.

(57) ABSTRACT

A power bank system includes a packaging container and a power bank. The packaging container defines an internal cavity and has an external receiving surface. The power bank has a battery, a primary coil, and a sensor. The power bank is positioned within the internal cavity such that the primary coil and the sensor are disposed proximate to an opposing side of the external receiving surface. The external receiving surface is configured to receive a portable device. The power bank is configured to deliver power from the battery to the portable device wirelessly via the primary coil and though the external receiving surface in response to the sensor detecting the portable device being positioned proximate the external receiving surface.

23 Claims, 4 Drawing Sheets

(56) References Cited

U.S. PATENT DOCUMENTS

| | | |
|---|---|---|
| 9,537,353 B1 | 1/2017 | Bossetti et al. |
| 9,887,030 B2 | 2/2018 | Lee et al. |
| D815,593 S | 4/2018 | Alves et al. |
| D816,029 S | 4/2018 | Dai |
| 10,032,557 B1 | 7/2018 | Bossetti |
| 10,068,217 B1 | 9/2018 | Gopalakrishan et al. |
| 10,225,637 B2 * | 3/2019 | Panecki .................. H04B 5/79 |
| 10,320,230 B2 | 6/2019 | Golko et al. |
| 10,397,683 B2 | 8/2019 | Leblanc et al. |
| D881,122 S | 4/2020 | Yao et al. |
| 10,721,343 B2 | 7/2020 | Nahum et al. |
| 11,070,098 B2 | 7/2021 | Ding et al. |
| D937,764 S | 12/2021 | Akana et al. |
| D963,569 S | 9/2022 | Ferber et al. |
| 11,444,479 B1 * | 9/2022 | Ferber .................. H02J 7/0042 |
| D972,503 S | 12/2022 | Akana et al. |
| D978,077 S | 2/2023 | Li |
| D995,419 S | 8/2023 | Luo |
| D999,735 S | 9/2023 | Yan |
| D1,002,529 S | 10/2023 | Huang |
| 2003/0030342 A1 | 2/2003 | Chen et al. |
| 2007/0182367 A1 | 8/2007 | Partovi et al. |
| 2015/0042268 A1 | 2/2015 | Chen et al. |
| 2017/0094391 A1 * | 3/2017 | Panecki .............. H04R 1/1016 |
| 2018/0284841 A1 | 10/2018 | Lee et al. |

OTHER PUBLICATIONS

"Podoru Wireless Portable Charger". Found online Aug. 4, 2022 at amazon.com. Reference dated Nov. 24, 2021. Retrieved from https://www.amazon.com/Wireless-Portable-Magnetic-10000mAh-Charging/dp/B09JZGN76Q?th=1. (Year: 2021).

"Magnetic Wireless Power Bank". Found online Jan. 24, 2023 at shopee.sg. Reference dated Jan. 6, 2021. Retrieved from https://shopee.sg/-Sg-Stock-Magnetic-Wireless-Power-Bank-Charger-5000-10000-20000MAh-i . 125369634.6672635808. (Year: 2021).

* cited by examiner

POWER BANK AND PACKAGING SYSTEM FOR A POWER BANK

CROSS-REFERENCE TO RELATED APPLICATIONS

This application is a divisional of U.S. patent application Ser. No. 17/395,140 filed on Aug. 5, 2021, now U.S. Pat. No. 11,444,479, issued Sep. 13, 2022, which is a continuation-in-part of U.S. patent application Ser. No. 17/209,378 filed on Mar. 23, 2021, the disclosures of which are hereby incorporated in their entirety by reference herein.

TECHNICAL FIELD

The present disclosure relates to power banks that are configured to charge mobile devices and packaging systems for power banks.

BACKGROUND

Power banks may be utilized to charge the batteries of mobile devices, such as a mobile phone. Power banks are commonly sold at retail outlets.

SUMMARY

A power bank system includes a packaging container and a power bank. The packaging container defines an internal cavity and has an external receiving surface. The power bank has a battery, a primary coil, and a sensor. The power bank is positioned within the internal cavity such that the primary coil and the sensor are disposed proximate to and on an opposing side of the external receiving surface. The external receiving surface is configured to receive a portable device. The power bank is configured to deliver power from the battery to the portable device wirelessly via the primary coil and through the external receiving surface in response to the sensor detecting the portable device being positioned proximate the external receiving surface.

A packaging system for a power bank includes a container and a fixture. The container defines an internal cavity configured to receive the power bank. The container has an external receiving surface configured to receive a portable device. The fixture is disposed within the internal cavity and is configured to engage the power bank to position a primary coil and a sensor of the power bank proximate an opposing side of the external receiving surface.

A power bank system includes a packaging container and a power bank. The packaging container defines an internal cavity and has an external surface. The power bank has a coil, is positioned within the internal cavity such that the coil is disposed on an opposing side of the external surface, and is configured to deliver power to the portable device wirelessly via the coil and though the external surface in response to the portable device being positioned on the external surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
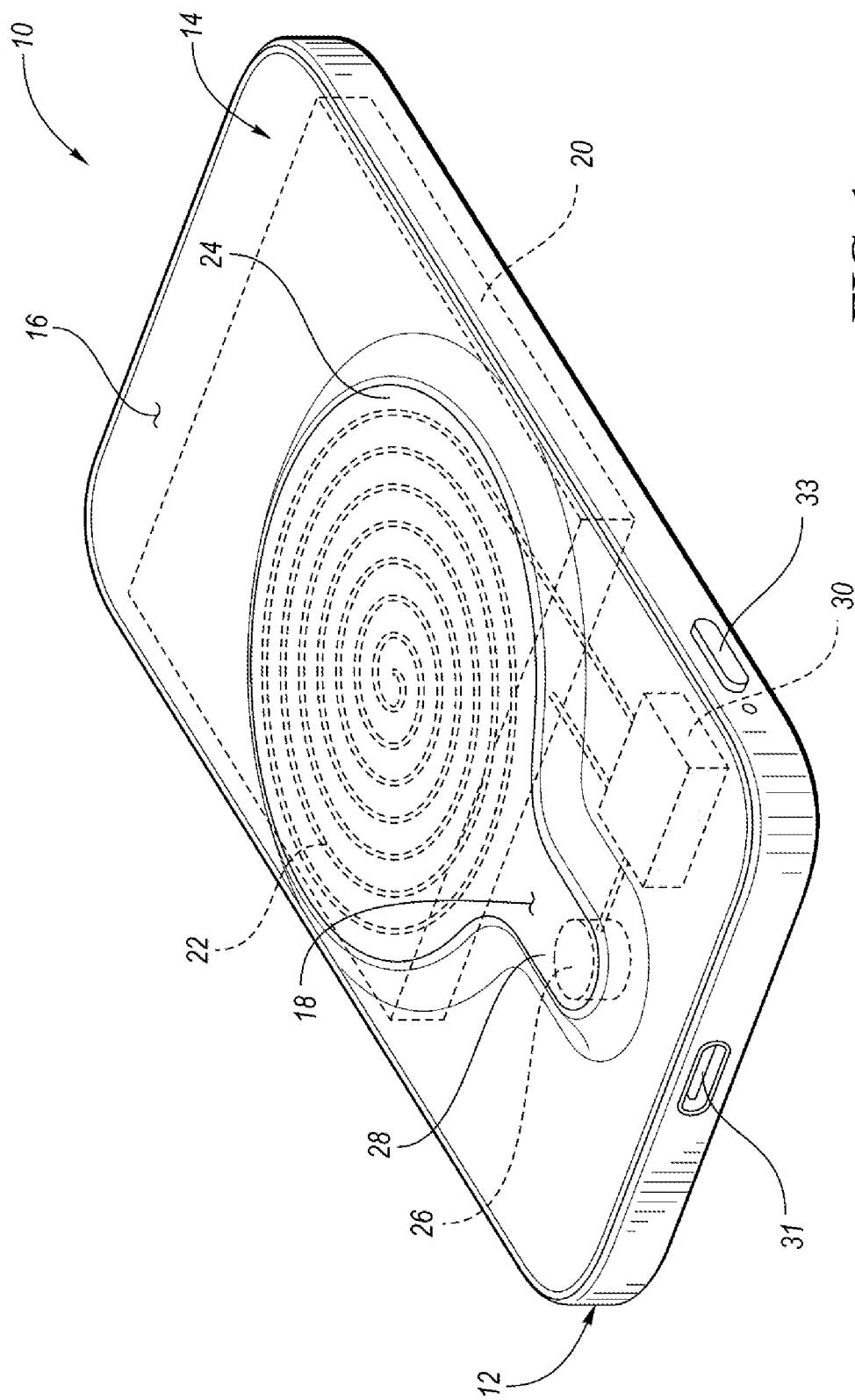
FIG. 1 is an isometric top view of a power bank.
Figure 2:
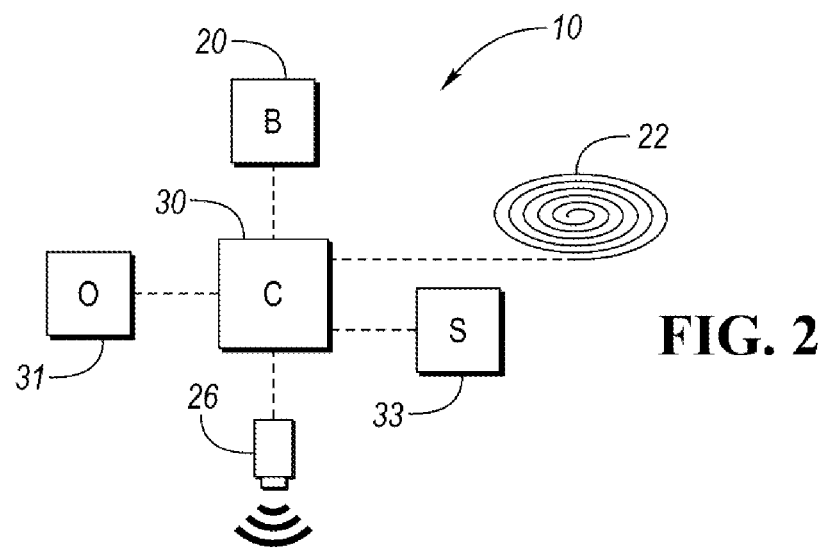
FIG. 2 is a control diagram for various subcomponents of the power bank.

Referring to FIGS. 1 and 2, a power bank 10 that is configured to charge portable devices that are external to the power bank 10, such as a mobile phone, is illustrated. The power bank 10 includes a housing 12 that is comprised of a plurality of external panels. A first of the external panels 14 has a lower surface 16 and an elevated surface 18. A battery 20 (or a bank of batteries or battery cells) are disposed within the housing 12. The battery 20 is configured to store electrical power. A primary coil 22 is disposed within the housing 12 and below a first portion 24 of the elevated surface 18. A sensor 26 is disposed within the housing 12 and below a second portion 28 of the elevated surface 18. The sensor 26 may more specifically be any type of sensor that is configured to detect magnetic fields, such as a hall-effect sensor. The first portion 24 of the elevated surface 18 may be a circular-shaped area and the second portion 28 of the elevated surface may be a linear-shaped area that protrudes from the circular-shaped area.

The power bank 10 also includes a controller 30. The controller 30 may also be disposed within the housing 12. The controller 30 in is communication with the battery 20, the primary coil 22, and the sensor 26 via input and output channels that are illustrated as dotted lines in FIG. 2. Each dotted line may represent input and output channels to and from each component of the power bank 10. The input and output channels may be comprised of electrical wires that transmits electrical signals between the various components of the power bank 10.

The controller 30 includes algorithms configured to control the various components of the power bank 10. For example, the controller 30 may be programmed to, in response to the sensor 26 detecting magnetic fields that are external to the power bank 10, deliver electrical power from the battery 20 to the primary coil 22. The magnetic fields that are external to the power bank 10 may be magnetic fields generated by portable devices, such as mobile phones, and may be detected in response to the portable devices being disposed on or proximate to the elevated surface 18. In one or more embodiments, "on" may refer to the portable device contacting the receiving external surface of the power bank packaging. In one or more embodiments, "proximate to" may refer to the portable device being close (e.g., 5 mm, 4 mm, 3 mm, 2 mm, 1 mm, 0.5 mm or less) but not contacting the receiving external surface. More specifically, the magnetic fields may be magnetic fields generated by secondary coils or magnets that are subcomponents of the portable devices. The sensor 26 detecting a magnetic field may be indicative that a portable device has been disposed on or proximate to the elevated surface 18 so that the power bank 10 may charge a battery of the portable device. More specifically, the sensor 26 detecting the magnetic field may be indicative that a distance between the primary coil 22 of the power bank 10 and a secondary coil within the portable device is small enough (e.g., 5 mm, 4 mm, 3 mm, 2 mm, 1 mm, 0.5 mm or less) so that the primary coil 22 may deliver electrical power from the battery 20 to the secondary coil via induction in order to charge a battery of the portable device.

The controller 30 may also be programmed to, in response to an absence of the sensor 26 detecting magnetic fields, forgo delivering electrical power from the battery 20 to the primary coil 22. The absence of detecting magnetic fields may be indicative that no portable device is present for charging (e.g., that no portable device has been disposed on or proximate to the elevated surface 18 so that the power bank 10 may charge the battery of the portable device via induction).

While illustrated as one controller, the controller 30 may be part of a larger control system and may be controlled by various other controllers throughout the power bank 10. It should therefore be understood that the controller 30 and one or more other controllers can collectively be referred to as a "controller" that controls various subcomponents of the power bank 10 in response to signals from various sensors to control functions the power bank 10 or power bank subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the power bank 10 or power bank subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the power bank 10 or its subsystems. The computer-readable storage devices or media may include one or more of a number of known physical devices which utilize electric, magnetic, and/or optical storage to keep executable instructions and associated calibration information, operating variables, and the like.

The power bank 10 may also include a port 31 configured to receive a power cord. The power cord may in turn be configured to plug into a power outlet to deliver power to the battery 20 via the port 31 to charge the battery 20. The power bank 10 may also include an ON/OFF switch 33 configured to turn the power bank 10 on and off if charging a portable device is desired or is not desired, respectively.

Figure 3:
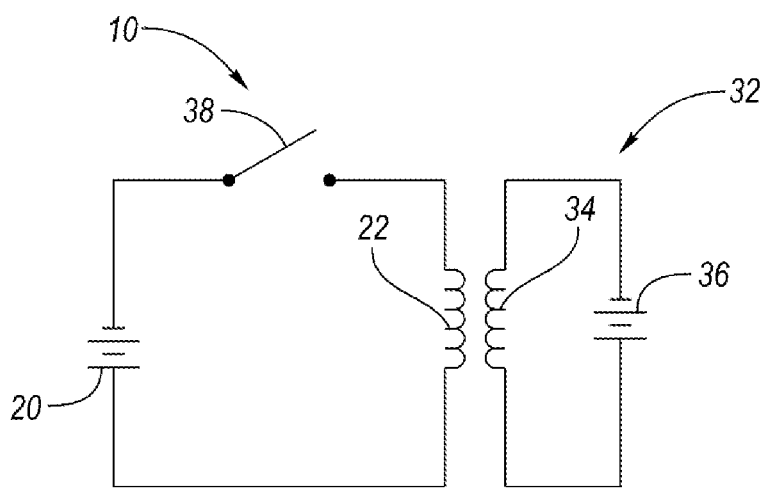
FIG. 3 is a diagram illustrating electrical components of the power bank and a portable device charged by the power bank.

Referring to FIG. 3, an electrical diagram of the power bank 10 and a portable device 32, such as a mobile phone, that is being charged by the power bank 10 is illustrated. The portable device 32 is external to the power bank 10. The primary coil 22 of the power bank 10 is configured to interact with a secondary coil 34 of the portable device 32 to charge a battery 36 of the portable device 32 in response to the portable device 32 being disposed proximate to the elevated surface 18 (e.g., the portable device 32 being disposed on or proximate to the elevated surface 18 so that the power bank 10 may charge the battery 36 of the portable device 32 via induction through the interaction between the primary coil 22 and the secondary coil 34).

The power bank 10 may include a switch 38. The switch 38 may be configured to close to deliver power to the primary coil 22 in response to the sensor 26 detecting a magnetic field generated by the portable device 32. The switch may also be configured to open to shut down delivering power to the primary coil 22 in the absence of detecting a magnetic field generated by the portable device 32. The switch 38 may be controlled by the controller 30, may be internal to the controller 30 (e.g., the switch 38 may comprise a transistor that switches on or off based on the state of the sensor 26), or the switch 38 may be integral to the sensor 26 (e.g., the sensor 26 includes the switch 38 and closes or opens the switch 38 in response to detecting or not detecting an external magnetic field, respectively).

Figure 4:
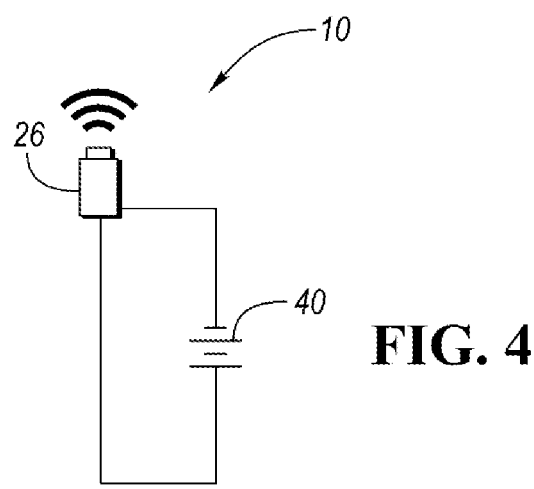
FIG. 4 is a diagram illustrating a sensor that is a subcomponent of the power bank and a power source for the sensor.

Referring to FIG. 4, an electrical diagram of the sensor 26 and a power source 40 for the sensor 26 is illustrated. The power source 40 for the sensor 26 may be battery 20. However, to prevent the sensor 26 from draining the battery 20 of the power bank 10, the power source 40 for the sensor 26 may be external to battery 20. For example, the power source 40 may be a second battery that is integral to the power bank 10 (i.e., a second battery disposed within the housing 12 of the power bank 10) or may be a second battery that is disposed external to the power bank 10 but within a common packaging or container. The power source 40 being a battery that is separate from battery 20 may be advantageous when the power bank 10 is disposed within a packaging container, is on display for sale, and is configured to allow a consumer to test the operability of the power bank 10 while it is still within the packaging container. This may minimize the amount of power from the battery 20 that is consumed via the sensor 26. If the battery 20 runs out of power under such a scenario, the consumer is not be able to test the operability of the power bank 10 without removing the power bank 10 from the packaging or container and plugging the power bank 10 into an electrical outlet via a power cord that engages port 31, which could likely require purchasing the power bank 10 without having the opportunity to test the functionality of the power bank 10.

The electrical diagrams in FIGS. 3 and 4 are for illustrative purposes. The power bank 10 may include additional electrical elements that are not illustrated, and some of the elements may be rearranged (e.g., elements that are shown to be in parallel may be rearranged to be in series or elements that are shown to be in series may be rearranged to be in parallel).

Figure 5:
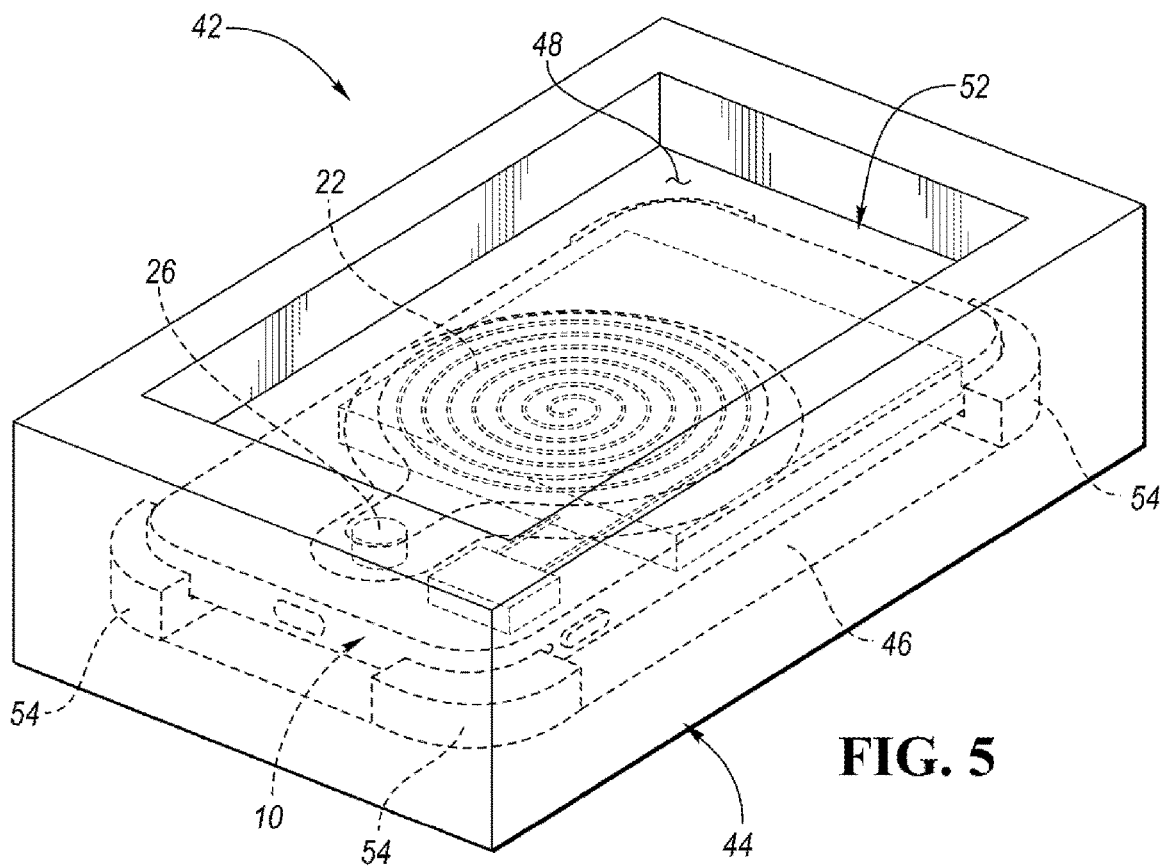
FIG. 5 is an isometric top view of a power bank system that includes the power bank and a packaging container for the power bank.
Figure 6:
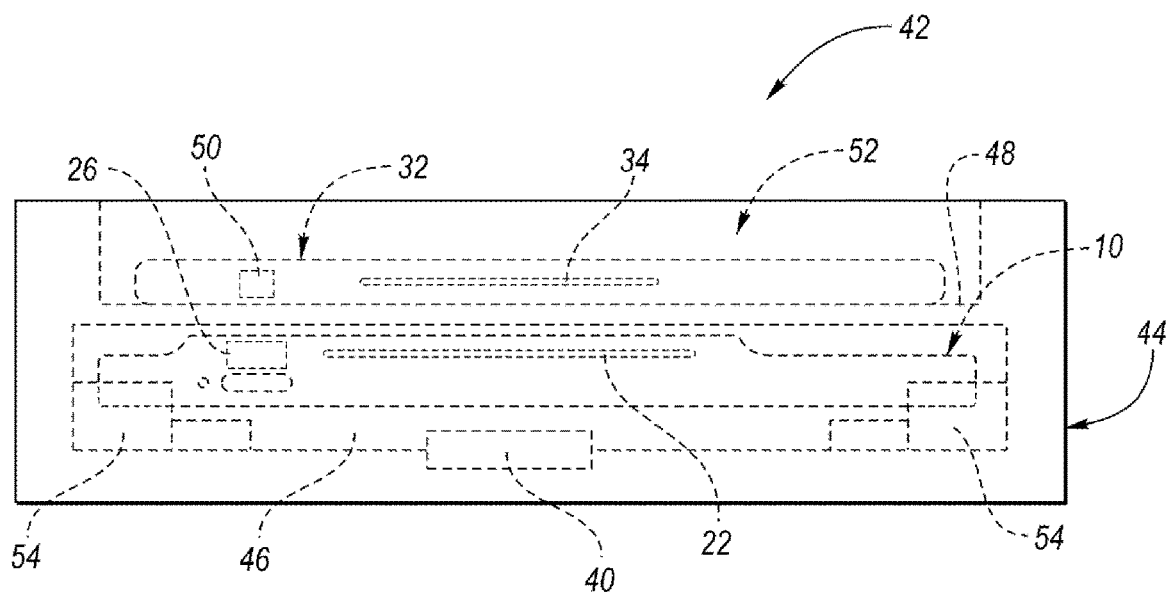
FIG. 6 is a side view of the power bank system that includes the power bank and the packaging container for the power bank.

Referring to FIGS. 5 and 6, a power bank system 42 includes the power bank 10 and a packaging container 44 for the power bank 10. The packaging container 44 defines an internal cavity 46 and has an external receiving surface 48. The internal cavity 46 is configured to receive the power bank 10 such that the primary coil 22 and the sensor 26 are disposed proximate to or on an opposing side of the external receiving surface 48. The external receiving surface 48 is configured to receive the portable device 32. More specifically, the packaging container 44 is configured to position the power bank 10 within the internal cavity 46 and to position the portable device 32 along the external receiving surface 48 to align the primary coil 22 of the power bank 10 with the secondary coil 34 of the portable device such that the power bank 10 is able to charge the battery 36 of the portable device via induction between the primary coil 22 and the secondary coil 34 through the external receiving surface 48. Also, the packaging container 44 is configured to position the power bank 10 within the internal cavity 46 and to position the portable device 32 along the external receiving surface 48 to align the sensor 26 so that it is able to detect the magnetic field of the secondary coil 34 or a magnetic field of a magnet 50 or other magnetic field generating object or device that is positioned within the portable device 32 for the purpose of being detected by the sensor 26.

It should be noted that when the power bank 10 is positioned within the internal cavity 46 and the portable device 32 is positioned along the external receiving surface 48, the distance between the primary coil 22 and the secondary coil 34 through the external receiving surface 48 is small enough (e.g., 5 mm, 4 mm, 3 mm, 2 mm, 1 mm, 0.5 mm or less) so that the primary coil 22 may deliver electrical power from the battery 20 to the secondary coil 34 via induction to charge the battery 36 of the portable device 32. The power bank 10 is illustrated as disposed within the internal cavity 46 in both FIGS. 5 and 6. The portable device 32 is illustrated as positioned on the external receiving surface 48 in FIG. 6 but not in FIG. 5 for illustrative purposes.

The external receiving surface 48 and one or more other external surfaces of the packaging container 44 may define a nest 52 configured to receive and to position the portable device 32 on the external receiving surface 48. More specifically, the nest 52 may be configured to position the secondary coil 34 proximate to the primary coil 22 (e.g., within a small enough range or distance (e.g., 7 mm, 6 mm, 5 mm, 4 mm, 3 mm, 2 mm, 1 mm, 0.5 mm or less) that extends through the external receiving surface 48 so that energy may be transferred from the primary coil 22 to the secondary coil 34 via induction) and to position the secondary coil 34 and/or the magnet 50 (or other magnetic field generating object or device on the portable device 34) within a small enough range or distance that extends through the external receiving surface 48 such that sensor 26 is able to detect the magnetic field generated by the secondary coil 34 and/or the magnet 50.

A packaging system that includes the packaging container 44 may also include one or more fixtures 54 that are disposed within the internal cavity 46. The one or more fixtures 54 may be configured to engage the power bank 10 to position the power bank 10 on an opposing side of the external receiving surface 48. More specifically, the one or more fixtures 54 may be configured to position the primary coil 22 and the sensor 26 of the power bank 10 on an opposing side of the external receiving surface 48 such that the primary coil 22 is positioned proximate to the secondary coil 34 (e.g., on the opposing side of the external receiving surface 48 and within a small enough range or distance (e.g., 7 mm, 6 mm, 5 mm, 4 mm, 3 mm, 2 mm, 1 mm, 0.5 mm or less) that extends through the external receiving surface 48 so that energy may be transferred from the primary coil 22 to the secondary coil 34 via induction) and to position the sensor 26 within a small enough range or distance that extends through the external receiving surface 48 to detect the magnetic field generated by the secondary coil 34 and/or the magnet 50 (or other magnetic field generating object or device on the portable device 34).

The power source 40 for the sensor 26 (if the power source is a battery separate from battery 20) may also be disposed within the internal cavity 46 of the packaging container 44. Electrical wires (not shown) may connect the power source 40 to the sensor 26. The wires may connect the power source 40 to the sensor 26 via the port 31 or any other electrical connection. The packaging container 44 may define a nest within the internal cavity 46 configured to receive and position the power source 40 within the internal cavity 46. Alternatively, the packaging system that includes the packaging container 44 may include a second fixture that is disposed within the internal cavity 46, where the second fixture is configured to position the power source 40 within the internal cavity 46.

Figure 7:
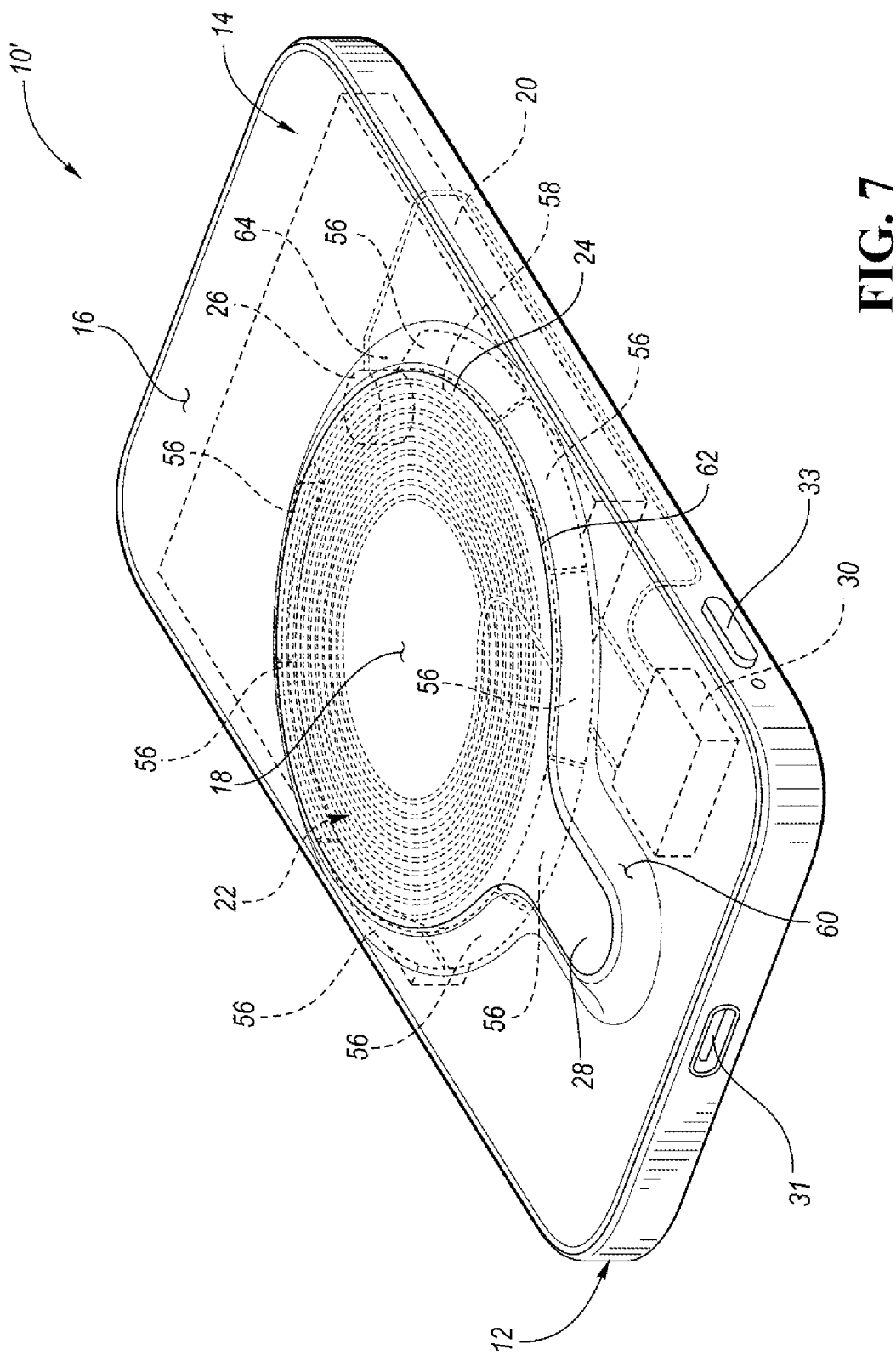
FIG. 7 is an isometric top view of a second embedment of the power bank.

Referring to FIG. 7, a second embodiment of the power bank 10' is illustrated. The second embodiment of the power bank 10' includes all the same subcomponents and has the same functionality as the power bank 10 illustrated in FIGS. 1-6, unless otherwise stated herein. The power bank 10' includes a housing 12 that is comprised of a plurality of external panels. A first of the external panels 14 has a lower surface 16 and an elevated surface 18. A battery 20 (or a bank of batteries or battery cells) are disposed within the housing 12. The battery 20 is configured to store electrical power. A primary coil 22 is disposed within the housing 12 and below a first portion 24 of the elevated surface 18.

A sensor 26 is disposed within the housing 12. The sensor may be disposed below any portion of the elevated surface 18. For example, the sensor 26 may be disposed below the first portion 24 of the elevated surface 18 or below a second portion 28 of the elevated surface 18. In some embodiments, the second portion 28 of the elevated surface 18 may be excluded. The sensor 26 may more specifically be any type of sensor that is configured to detect magnetic fields, such as a hall-effect sensor. The first portion 24 of the elevated surface 18 may be a circular-shaped area and the second portion 28 of the elevated surface may be a linear-shaped area that protrudes from the circular-shaped area.

The power bank 10' further comprises an array of magnets 56 disposed within the housing 12 and about an outer periphery 58 of the primary coil 22. The magnets of the array of magnets 56 may be utilized to secure the position of the portable device 32 on the power bank 10' by interacting with an iron subcomponent or a corresponding set of magnets that are part of the portable device 32. The array of magnets 56 may be disposed below the elevated surface 18 or below an inclined surface 60 that extends from the lower surface 16 to the elevated surface 18. The inclined surface 60 may extend about an outer periphery 62 of the elevated surface 18. The sensor 26 may also be disposed below the inclined surface 60. A gap 64 may be defined between first and second magnets of the array of magnets 56. The sensor 26 may be disposed within the gap 64. Alternatively, the array of magnets 56 may comprise a single magnet, and such a single magnet may define the gap 64.

The power bank 10' also includes a controller 30. The controller 30 may also be disposed within the housing 12. The controller 30 is in communication with the battery 20, the primary coil 22, and the sensor 26 via input and output channels that are illustrated as dotted lines in FIG. 2. Each dotted line may represent input and output channels to and from each component of the power bank 10'. The input and output channels may be comprised of electrical wires that transmit electrical signals between the various components of the power bank 10'.

The controller 30 includes algorithms configured to control the various components of the power bank 10'. For example, the controller 30 may be programmed to, in response to the sensor 26 detecting magnetic fields that are external to the power bank 10', deliver electrical power from the battery 20 to the primary coil 22. The magnetic fields that are external to the power bank 10' may be magnetic fields generated by portable devices, such as mobile phones, and may be detected in response to the portable devices being disposed on or proximate to the elevated surface 18. In one or more embodiments, "on" may refer to the portable device contacting the receiving external surface of the power bank packaging. In one or more embodiments, "proximate to" may refer to the portable device being close (e.g., 5 mm, 4 mm, 3 mm, 2 mm, 1 mm, 0.5 mm or less) but not contacting the receiving external surface. More specifically, the magnetic fields may be magnetic fields generated by secondary coils or magnets that are subcomponents of the portable devices. The sensor 26 detecting a magnetic field may be indicative that a portable device has been disposed on or proximate to the elevated surface 18 so that the power bank 10' may charge a battery of the portable device. More specifically, the sensor 26 detecting the magnetic field may be indicative that a distance between the primary coil 22 of the power bank 10' and a secondary coil within the portable device is small enough (e.g., 5 mm, 4 mm, 3 mm, 2 mm, 1 mm, 0.5 mm or less) so that the primary coil 22 may deliver electrical power from the battery 20 to the secondary coil via induction in order to charge a battery of the portable device.

The controller 30 may also be programmed to, in response to an absence of the sensor 26 detecting magnetic fields, forgo delivering electrical power from the battery 20 to the primary coil 22. The absence of detecting magnetic fields may be indicative that no portable device is present for charging (e.g., that no portable device has been disposed on or proximate to the elevated surface 18 so that the power bank 10' may charge the battery of the portable device via induction).

While illustrated as one controller, the controller 30 may be part of a larger control system and may be controlled by various other controllers throughout the power bank 10'. It should therefore be understood that the controller 30 and one or more other controllers can collectively be referred to as a "controller" that controls various subcomponents of the power bank 10' in response to signals from various sensors to control functions the power bank 10' or power bank subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the power bank 10' or power bank subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the power bank 10' or its subsystems. The computer-readable storage devices or media may include one or more of a number of known physical devices which utilize electric, magnetic, and/or optical storage to keep executable instructions and associated calibration information, operating variables, and the like.

The power bank 10' may also include a port 31 configured to receive a power cord. The power cord may in turn be configured to plug into a power outlet to deliver power to the battery 20 via the port 31 to charge the battery 20. The power bank 10' may also include an ON/OFF switch 33 configured to turn the power bank 10' on and off if charging a portable device is desired or is not desired, respectively.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A power bank system comprising:
a packaging container defining an internal cavity and having an external receiving surface; and
a power bank having an external housing, a battery, a primary coil, and a sensor, wherein (i) the external housing includes a plurality of external panels, (ii) the battery, the primary coil, and the sensor are disposed within the external housing such that the primary coil and the sensor are disposed below a first of the external panels, (iii) the power bank is removably positioned within the internal cavity of the packaging container such that the first of the external panels is disposed proximate to and on an opposing side of the external receiving surface, (iv) the external receiving surface is configured to receive a portable device, and (v) the power bank is configured to deliver power from the battery to the portable device wirelessly via the primary coil, through the first of the external panels, and through the external receiving surface in response to the sensor detecting the portable device being positioned proximate the external receiving surface.

2. The power bank system of claim 1, wherein the external receiving surface defines a nest that is configured to receive the portable device.

3. The power bank system of claim 1 further comprising a fixture disposed within the internal cavity, wherein the fixture is configured to engage the power bank to position the first of the external panels proximate the opposing side of the external receiving surface.

4. The power bank system of claim 1, wherein the sensor is a hall-effect sensor configured to detect a magnetic field generated by the portable device.

5. The power bank system of claim 1, wherein the sensor is powered via the battery.

6. The power bank system of claim 1, wherein the sensor is powered via a second battery.

7. The power bank system of claim 6, wherein the second battery is integral to the power bank.

8. The power bank system of claim 6, wherein the second battery is separate from the battery and is disposed within the internal cavity.

9. The power bank system of claim 1 further comprising a controller programmed to, in response to the sensor detecting the portable device, deliver electrical power from the battery to the primary coil, and in response to an absence of the sensor detecting the portable device, forgo delivering electrical power from the battery to the primary coil.

10. The power bank system of claim 1, wherein the first of the external panels comprises lower and elevated surfaces, and wherein the primary coil is at least partially disposed below the elevated surface and at least partially above the lower surface.

11. A packaging system for a power bank comprising:
a container defining an internal cavity configured to receive the power bank and having an external receiving surface configured to receive a portable device; and
a fixture disposed within the internal cavity and configured to removably receive the power bank and to engage the power bank to position (i) an external housing of the power bank, (ii) a primary coil of the power bank that is disposed within the external housing, and (iii) a sensor of the power bank that is disposed within the external housing proximate an opposing side of the external receiving surface such that the power bank is configured to deliver power to the portable device wirelessly via the coil, through the external housing, and through the external receiving surface.

12. The packaging system of claim 11, wherein the external receiving surface defines a nest that is configured to receive the portable device.

13. The packaging system of claim 12, wherein portable device has a secondary coil and the nest is configured to position a secondary coil proximate to the primary coil and the sensor such that the sensor detects a magnetic field of the secondary coil and such that the primary coil delivers electrical power to the secondary coil via induction.

14. The packaging system of claim 11, wherein the internal cavity is configured to receive a power source that is separate from the power bank and is configured to power the sensor.

15. The packaging system of claim 11, wherein the external housing includes a plurality of external panels, the coil is disposed below a first of the external panels, and the first of the external panels comprises lower and elevated surfaces, and wherein the primary coil is at least partially disposed below the elevated surface and at least partially above the lower surface.

16. A power bank system comprising:
a packaging container defining an internal cavity and having an external surface; and
a power bank having an external housing and a coil, wherein (i) the external housing includes a plurality of external panels, (ii) the coil is disposed within the external housing and below a first of the external panels, (iii) the power bank is removably positioned within the internal cavity of the packaging container such that the first of the external panels is disposed on an opposing side of the external surface, and (iv) the power bank is configured to deliver power to the portable device wirelessly via the coil, through the first of the external panels, and through the external surface in response to the portable device being positioned on the external surface.

17. The power bank system of claim 16 further comprising a controller programmed to, in in response to the portable device being positioned on the external surface, deliver power to the portable device via activating the coil, and in response to an absence of the portable device on the external surface, deactivate the coil.

18. The power bank system of claim 16, wherein the external surface defines a nest that is configured to receive the portable device.

19. The power bank system of claim 16 further comprising a fixture disposed within the internal cavity, wherein the fixture is configured to engage the power bank to position the first of the external panels proximate to the opposing side of the external surface.

20. The power bank system of claim 16, wherein the internal cavity is configured to receive a power source that is separate from the power bank.

21. The power bank system of claim 3, wherein the fixture elevates the power bank within the internal cavity such that the power bank is spaced-apart from a lower region of the internal cavity.

22. The packaging system of claim 11, wherein the fixture elevates the power bank within the internal cavity such that the power bank is spaced-apart from a lower region of the internal cavity.

23. The power bank system of claim 19, wherein the fixture elevates the power bank within the internal cavity such that the power bank is spaced-apart from a lower region of the internal cavity.

* * * * *

UNITED STATES PATENT AND TRADEMARK OFFICE
CERTIFICATE OF CORRECTION

PATENT NO. : 12,149,115 B2
APPLICATION NO. : 17/881040
DATED : November 19, 2024
INVENTOR(S) : Roman Ferber et al.

Page 1 of 1

It is certified that error appears in the above-identified patent and that said Letters Patent is hereby corrected as shown below:

In the Claims

Column 10, Lines 64-65, Claim 17:
After "controller programmed to,"
Delete "in" (first occurrence).

Signed and Sealed this
Twenty-eighth Day of October, 2025

John A. Squires
*Director of the United States Patent and Trademark Office*